United States Patent [19]

Curci

[11] Patent Number: 4,525,123
[45] Date of Patent: Jun. 25, 1985

[54] ROTARY WING AIRCRAFT

[76] Inventor: Alfred Curci, 183 London Dr., Hamden, Conn. 06514

[21] Appl. No.: 375,763

[22] Filed: May 6, 1982

[51] Int. Cl.$^3$ ............................................. B64C 11/30
[52] U.S. Cl. ................................... 416/115; 416/114; 416/98
[58] Field of Search ................. 416/114, 115, 98, 128; 244/17.25, 17.11, 237, 235

[56] References Cited

U.S. PATENT DOCUMENTS

| | | | |
|---|---|---|---|
| 2,546,881 | 3/1951 | Avery | 416/114 |
| 2,606,622 | 8/1952 | Bates | 416/114 |
| 3,199,601 | 8/1965 | Dean et al. | 416/98 |
| 3,521,971 | 7/1970 | Cheney, Jr. | 416/128 |
| 3,545,702 | 12/1970 | Laville | 416/98 |
| 3,799,695 | 3/1974 | Yamakawa | 416/114 |
| 4,227,856 | 10/1980 | Verrill et al. | 416/114 |

Primary Examiner—Stephen Marcus
Assistant Examiner—John Kwon

[57] ABSTRACT

In a helicopter having a power shaft with a main axis and bearings for supporting an even number of blades for pivoting about their longitudinal axes, arms mounted on the respective blades for pivoting them in the same and opposite directions for cyclic and total pitch control, respectively, a featured control lever mounted intermediate its ends on a first pivot which lies in a first plane in which the main axis lies, with the control lever having movability of first and second kinds bodily with its pivot axis in the first plane and rockable about its pivot axis, respectively, links connecting the ends of the control lever with the free ends of the arms for pivoting the blades in first and second directions on movements of the control lever of the first and second kinds, respectively, an axially immovable control shaft turning with the power shaft, a swashplate mounted on the control shaft for universal movement on the latter, a first operating connection between the swashplate and first pivot, and including a follower member slidable on the control shaft and in follower relation with the swashplate, to impart to the control lever movement of one of said kinds on axial motion of the follower member, a manual control member operatively connected with the swashplate and operable for shifting the latter into any of its universal positions, another manual control member, a second operative connection between the other control member and control lever for imparting to the latter movement of the other kind on manipulation of the other control member.

12 Claims, 9 Drawing Figures

ROTARY WING AIRCRAFT

This invention relates to aircraft and in particular it relates to a simplified and improved flight-control unit for rotary-wing aircraft.

One object of this invention is to provide a simplified, compact control unit comprising a casing forming a supporting enclosure for the various flight control mechanisms.

Another object of this invention is to provide a control unit which, unlike prior-art control devices, is not limited to a concentric mounting position with respect to the rotor shaft. A significant feature of the present control unit permits wide latitude in the selection of an optimum mounting location of the control unit on an aircraft, either adjacent to or horizontally spaced-apart from the rotor axis.

Another object of the present invention is to provide a control unit which is adapted for mounting on the airframe having various angularities between the control unit shaft and the rotor shaft. Positional changes of the control unit may be easily carried out by mere reversal or substitution of the casing mounting elements, and by replacement of the driving means and the control links having different suitable lengths, without requiring alteration of the internal construction or operation of the control unit.

A further object of this invention is to provide a control unit which need not be tailored, as in the past, for one particular rotor system. The present control unit may be designed to meet a broad range of structural and aerodynamic requirements of various rotor systems, constructed in accordance with the present invention, whereby one basic control unit may be readily adapted for controlling single or multi-rotor systems of different sizes and installed power.

Another feature of this invention provides a control unit adapted for bench assembly, testing and balancing. Thus, as a completely assembled control package it may be available as an off-the-shelf control unit, suitable for easy field installation or replacement on the craft.

Still another feature of this invention is to provide for simplified maintenance and inspection of the control unit. Also, when required, the entire control unit may be easily removed from and replaced on the aircraft with only minimal hand tools, without requiring, as in the past, the dismantling of major rotor components. This is especially desirable in the field where adequate servicing equipment often is lacking.

Another object of this invention provides a control unit of the above-designated character which dispenses with the prior need for compensating devices or mixing linkages in order to avoid control action disturbance or interference between the application of a vertical and horizontal control force. In the present invention, feedback or disturbance between the cyclic and the collective control action is positively precluded, inasmuch as only the cyclic control circuit is positively connected to the swashplate which is axially immovable. Thus, whether the cyclic and collective control organs are actuated consecutively or simultaneously, control interference therebetween is avoided.

Another object of this invention is to provide a control unit of the aforesaid construction which may be mounted in various locations on the airframe, completely out of the airstream, where it will not be subjected to parasite drag or damage from atmospheric conditions.

Still another object is to provide a control unit, as aforesaid, which conveniently facilitates the inclusion of a self-contained lubrication system.

A further advantage comtemplated for the present invention is that the control unit casing may be designed to incorporate any known auxiliary flight control system, such as, for example, power assisting or stabilizing control means.

Another important object of this invention is to provide a novel and simplified power drive means for the drive of the aforesaid control unit in a synchrophased relationship with the rotor system. The present drive means eliminates the need for the complicated train of universally hinged elements, such as "scissors linkage", used for the drive of prior control swashplate devices. The present drive system is especially advantageous when used for the control of two counterrotating rotor systems, since it avoids all of the prior mechanical difficulties entailed in the drive of two axially-displaceable, oppositely rotating swashplate devices.

Still another significant advantage of the present invention, inherent in the present drive system for the control unit, is to provide automatic compensation for gyroscopic precession of the rotor, thereby eliminating the need for compensating devices such as required in operational machines in order to overcome this control time lag.

Another object of the present invention is to provide a simple and novel auxiliary control means for maintaining directional heading of the craft, comprising a cyclic control dephasing unit interposed between the driving and driven member of the control unit. The dephasing unit may be automatically or pilot controlled to advance or retard the azimuth point at which a cyclic pitch control input to a rotor lift blade normally takes effect.

Another object of the invention is that it eliminates the past need for very large diameter, heavy and costly bearings required between the rotating and nonrotating parts of the swashplate assembly.

Other objects and advantages will be apparent from the specification and claims, and from reference to the accompanying drawings which illustrate several forms of the invention.

Figure 1:
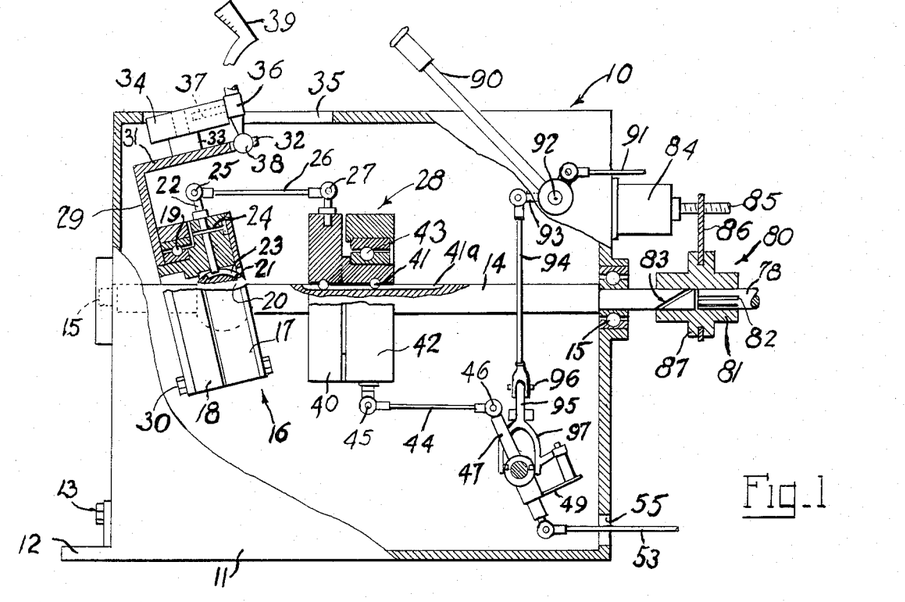
FIG. 1 is a side elevation of the control unit illustrated with portions of the casing wall broken away and showing the control unit mechanism partly in elevation and partly in section.

With reference first to FIG. 1, the control unit, indicated generally at 10, consists of a frame or casing 11 which forms a supporting enclosure for the various control mechanisms. To facilitate the assembly of the internal control mechanisms, and also to permit easy access thereto for inspection or servicing, the casing 11 may be provided with one more removable walls or cover plates suitably secured thereon by any known means (not shown). The casing 11 also may be provided with various interchangeable or shiftable mounting brackets 12, one is shown in FIG. 1, to facilitate the application of the control unit 10 in any desired position or location on a given helicopter airframe structure, either adjacent to or remote from the rotor axis.

Still with reference to FIG. 1, a control shaft 14 is axially fixed and supported for rotation in the casing 11, with the end walls of the latter providing journals 15—15 for the opposite ends of shaft 14. One end of the latter is adapted for coupling with the power drive means for the rotor system and arranged for turning the shaft 14 at rotor speed. The shaft drive coupling means, designated generally at 80, is interposed between the shaft 14 and power drive means and provides a novel adjustable cyclic control dephasing unit, which will be described fully hereinafter.

The control shaft 14 carries a swashplate assembly, indicated generally at 16, which consists of two basic parts. One part is a ring member 17 rotatable with and tiltable universally on shaft 14. The second part is a nonrotating ring 18 carried for relative rotation on ring 17 by interposed bearing 19. The swashplate assembly 16 preferably is mounted on shaft 14 for universal shifting by ball and socket means 20 and 21, respectively. The ball 20 is suitably fixed on the control shaft 14 and in turn the swashplate member is keyed to ball 20 for rotation therewith and universal motion thereabout by one or more pins 22 (one is shown in FIG. 1) extending radially through a suitable aperture in ring 17 with the inner end of the pin 22 slidably engaging a circumferential keyway or guide slot 23 formed in ball 20. A retention pin 24 prevents axial displacement of pin 22 and the upper end of the latter provides a universal pivot at 25 for one end of a motion transferring link 26. The opposite end of the latter is pivoted at 27 to a swashplate follower member, generally designated 28. The follower member 28, which will be described in detail later, is slidably carried on the control shaft 14 and, through motion of the link 26, receives a periodic reciprocating motion as it follows any selected inclined plane of the rotating swashplate.

The mechanism for selectively shifting the swashplate 16 into any of its universal positions comprises control input means, including a lever or bracket 29 secured to the forward face of the nonrotating swashplate ring 18, such as by bolts 30. The bracket 29 is formed as an inverted "L" with the horizontal arm 31 thereof extending above and parallel to the axis of the swashplate. The free end of the bracket arm 31 is bifurcated at 32 for a purpose made clear hereafter. Integral with or suitably fixed on the arm 31, at a point of the extended axis of the center of ball 20, is a stud 33. The latter provides a journal for guide block 34 arranged to slidably operate in the longitudinal guideway or slot 35 formed in the upper wall of the casing 11, whereby fore-and-aft motion of the block 34 along the slot 35 causes a corresponding tilt of the swashplate member 16 about a horizontal axis.

The means for laterally tilting the swashplate 16 about a vertical axis includes a lever 36 having a fixed pin 37 which is suitably journaled for rocking movement in a hole bored longitudinally in the guide block 34. The lower end of the lever is formed as a spherical ball 38 which operatively engages the before-mentioned bifurcation 32 of the arm 31 and, in effect, the elements 32 and 38, respectively, constitute ball-and-socket means, whereby lateral displacement of the lever 36 causes the bracket 29 to turn about the pivot 33 and accordingly turns the swashplate 16 about the ball point 20. Of course, selective conjoint lateral and fore-and-aft displacements of the lever 36 shifts the swashplate member 16 into any of its universal positions relative to shaft 14. As shown, an extended manual control stick 38 may be detachably secured to the lever 36 by any suitable means.

As mentioned previously, the cyclic output control includes a follower member 28 slidably mounted on shaft 14 and operatively connected in follower relation with the swashplate member 16 by link member 26, so that the follower receives a periodic or cyclic reciprocating motion along shaft 14 as it follows any selected inclined plane of the rotating swashplate 17. The follower member 28 consists of two primary elements of which one is a ring 40 carried for joint rotation and axial motion on the control shaft 14. The ring 40 is keyed to shaft 14 by linear bearings 41 which engage and ride along the axial groove 41a of shaft 14. The other follower element is a nonrotating ring 42 carried for relative rotation on ring 40 by interposed bearing 43. One end of link 44 is pivoted at 45 to the nonrotating ring 42 and the other end of link 44 is pivoted at 46 to the upper end of the rocker arm 47. The latter is fixed on and intersects the shaft 48 mounted transversely in casing 11 for rocking movement, with the opposite ends of the shaft 48 being journaled, respectively, in brackets 50 and 51 suitably fixed in the casing 11.

Figure 2:
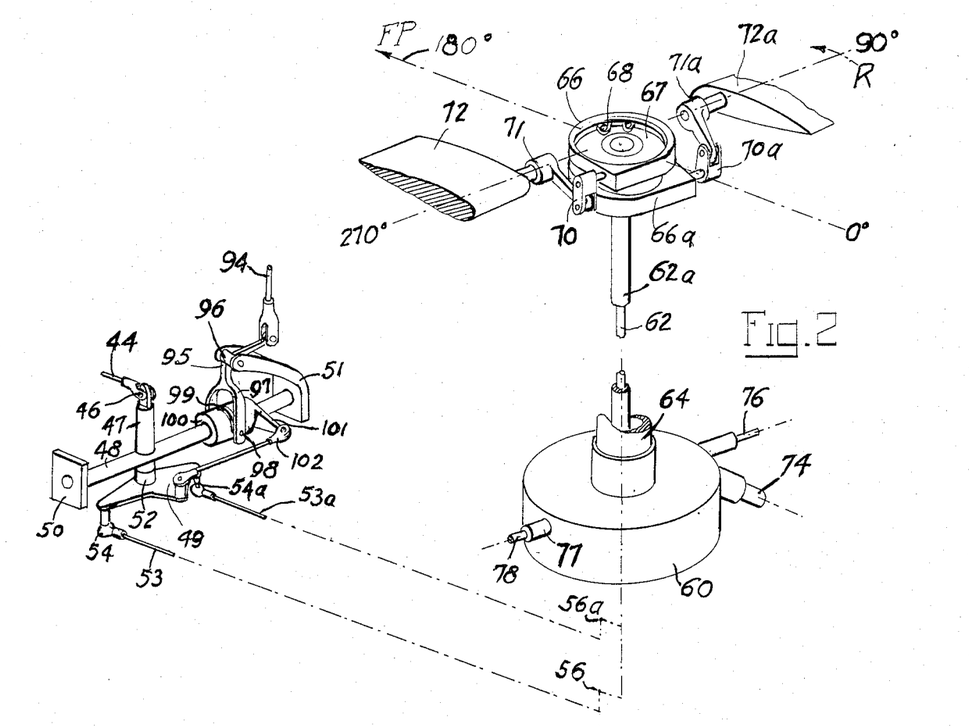
FIG. 2 is a perspective view of certain control elements of FIG. 1 shown together with a two bladed rotor system.

As seen most clearly in FIG. 2, a control lever 49 is mounted intermediate its ends on a turn axis or pivot 52 fixed on the lower end of the rocker 47. The control lever 49 has bodily movability with the rocker pivot 52 at all times during cyclic operation. It should be noted, however, that during this cyclic bodily movement of the control lever 49, the latter normally remains in a fixed position with respect to its turn axis or pivot 52. The control lever 49 is selectively turnable or adjustable about the pivot 52 for imparting collective pitch change to the rotor lift blades only on manipulation of the total or collective pitch mechanism, which will be described fully later.

Motion-transferring links 53 and 53a are universally pivoted at 54 and 54a to the respective opposite ends of the control lever 49. The links 53 and 53a pass through holes in casing 11 (one hole is shown at 55 in FIG. 1) and the respective outer ends of the links are pivoted to bell cranks 56 and 56a. The latter may be fulcrumed to suitable brackets, such as the one shown at 58 in FIG. 3, and in turn the brackets may be fixed on the lower wall of the rotor gear case 60. Pivoted to the respective horizontal arms of the bell cranks 56 and 56a are concentric, nonrotating push-pull control tubes 62 and 62a. The inner control tube 62 slidably passes through the outer control tube 62a and in turn both control tubes slidably extend upward through the fixed vertical standpipe or housing 64. The control tubes terminate within the rotor hub which forms part of the rotor drive shaft, illustrated fragmentarily at 65 in FIG. 3.

Carried for relative rotation on the respective upper ends of the control tubes 62 and 62a are ring members 66 and 66a, which are illustrated greatly enlarged in the drawings. Bearing means, one is indicated at 67, interposed between the aforementioned rings and control tubes, permit the rings to rotate with the rotor blades. Suitable retention means, such as the one shown at 68, prevent axial displacement of the rings relative to the control tubes. Pivoted to the rings 66 and 66a are links 70 and 70a, and the respective opposite ends of the latter are pivoted to the rotor blade pitch horns or arms 71 and 71a, with the latter mounted with one end on the respective root ends of the rotor lift blades 72 and 72a. The latter are pivotally carried in the rotor hub 65 by any well-known torsion hinge means, for individual pivoting about their longitudinal axes.

During cyclic operation of the control unit 10, the control tubes 62 and 62a receive, by means and in a manner already explained, a vertical reciprocating motion in unison of which the phase is the phase of cyclic feathering. This phased motion is imparted to the blade pitch arms 71 and 71a thereby cyclically rocking the blades 72 and 72a as a virtual solid beam about their individual pivots in the same direction.

A feature of the present invention provides novel and simple means, described in detail later, to automatically compensate for gyroscopic precession of the spinning rotor. For this reason, in a rotor system, constructed in accordance with the present invention, having two or more even number of lift blades, the pitch arms may be connected to their respective blades, as shown at 71 and 71a in FIGS. 2 and 3, with the free ends of the latter extending in alternate directions and without the conventional offset relative to the plane of rotation.

Figure 7:
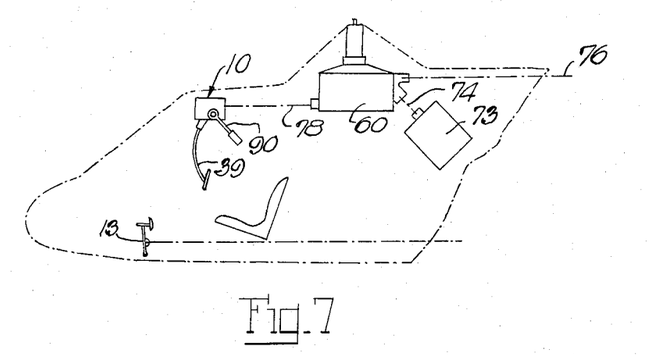
FIGS. 7, 8 and 9 are diagrammatic views suggesting three of the many possible positional applications of the control unit on an aircraft.

The power drive means for the control unit and the rotor system includes a suitable engine, shown diagrammatically at 73 in FIG. 7, mounted in the craft. A suitable shaft 74 interconnects the engine 73 and the rotor gear box 60 for the drive of the rotor in the usual manner through reduction gears, not shown. The gear box may include, when needed, a power shaft 76 for driving a conventional anti-torque tail rotor not shown. For the drive of the control shaft 14, the gear box 60 is provided with a power take-off 77 which turns at rotor speed and drives the shaft 78. The opposite end of shaft 78 extends to and is coupled with the control shaft 14 by novel connecting means, indicated generally at 80 in FIG. 1. The latter comprises a sleeve member 81 which is selectively adjustable in a manner and for a purpose described fully hereinafter. However, for the present let it be understood that the coupling sleeve 81 merely makes the aforesaid shafts 78 and 14 continuous for joint rotation. These shafts must be properly connected during assembly to automatically allow for gyroscopic precession and also to ensure that a cyclic output from the control unit 10 will be in phase relation with the spinning rotor blades.

This synchrophase setting between the control unit 10 and the rotor system is easily accomplished. It requires a simple timing procedure that may be considered somewhat analogous to the valve timing operation of an automotive gasoline engine. If desired, the shafts 78 and 14 may be provided with timing marks and these should be aligned exactly during assembly. However, the correct drive setting of the shaft 78 with respect to the control shaft 14 may be easily obtained when the link 26 is at the instantaneous 12 o'clock or top-dead center position as shown in FIG. 1, and the rotor blades 72 and 72a, as shown in FIG. 2, are positioned with their longitudinal axes normal to the flight path of the craft, which latter is in the direction of arrow FP.

From the foregoing, it will be apparent that allowance for gyroscopic precession of the rotor simply has been incorporated in the proper setting of the drive means for the systems. This serves also to properly phase all cyclic operations of the systems so that the flight direction of the craft will correspond with the direction of cyclic stick displacement.

Another feature of the present invention is that the collective pitch mechanism is distinguished from the prior art by novel mechanical features of functional significance. The present collective control means eliminates the prior need for "mixing" or "compensating" devices in order to avoid feedback or disturbance between the collective and cyclic control action. This control interference is avoided by a positive mechanical separation of the two control functions. Only the cyclic control circuit is operatively connected to the swashplate.

As shown in FIGS. 1 and 2, the collective pitch mechanism comprises a manual control lever or stick 90 of conventional construction which is turnable in two directions for increasing or decreasing the total pitch of the rotor blades. The stick 90 may be provided with any well-known mechanism (not shown) for coordinating the engine throttle with the collective pitch adjustments. The lower end of the stick 90 has a fixed shaft 92 which extends through and is pivoted for rocking movement in an aperture in the side wall of the casing 11. Solidly fixed on the inner end of the shaft 92 is a radial arm 93 to which is pivoted one end of link 94 and the opposite end of link 94 is pivoted to the horizontal arm of the bell crank 95. The apex of the latter is fulcrumed in the forked end of the before-mentioned bracket 51 and the lower opposite arm of the bell crank is bifurcated forming a yoke 97. Each arm of the latter is provided with an inwardly extending fixed pin 98 which operatively engages the annular groove 99 of a ring member 100. The latter is axially slidable along the previously-described cross shaft 48 and is also keyed thereto for joint rotation. The ring 100 has a radial arm 101 to which is pivoted one end of link 102, and the opposite end of the latter is pivoted, as shown in FIG. 2, to another arm of the control lever 49.

The operation of the just-described collective pitch control mechanism, the details of which may be clear from following the motion of the parts in the drawings, is as follows: To increase the total or collective pitch of the rotor blades, the manual pitch stick 90 is raised or turned clockwise (FIG. 1) which movement causes link 94 to move upward to rotate the bell crank 95 counterclockwise (FIG. 2) and in turn translate the coacting ring 100 to the right along shaft 48. This axial motion of ring 100, through interconecting link 102, swings the control lever 49 about its pivot axis 52, thereby moving the attached links 53 and 53a in opposite directions relative to each other. Thus, link 53 moves to the right as link 53a moves an equal distance to the left and this movement of the links, through bell cranks 56 and 56a, causes the control tubes 62 and 62a to move vertically through an equal distance also in opposite directions relative to each other. Thus, control tube 62 moves up as the control tube 62a moves down, and the result that this motion of the control tubes coacting with the respective blade pitch horns or arms 71 and 71a, causes a simultaneous equal and opposite rotation of the rotor blades 72 and 72a about their respective individual pitch axes, thereby collectively increasing the pitch of both blades by an equal amount.

From the above, it will be apparent that because of the mechanical separation of the two control mechanisms, the collective and cyclic pitch control sticks may be actuated singly or together without incurring, as in the past, any feedback or interference therebetween. This is accomplished without the need for complex compensating linkages required in operational machines.

As already discussed, two significant advantages result from the drive means for the control unit 10 and the rotor system. Additionally, the drive means provides a third novel feature comprising a selectively adjustable cyclic control dephasing unit which may be interposed between the control shaft 14 and the power shaft 78. The dephasing device may function as an auxiliary flight control means for maintaining a desired directional heading of the helicopter.

The dephasing mechanism for selectively advancing or retarding the cyclic control output from the control unit 10 is illustrated semi-diagrammatically and indicated generally at 80 in FIG. 1. Of course, other equivalent mechanisms may be used to accomplish this dephasing function. For example, an epicycle train consisting of adjustable gear means may be substituted. However, in this case, the dephasing means comprises a sleeve member 81 which has a splined, sliding fit over the shafts 14 and 78. The latter is provided with axial splines 82 cut in its circumference and the former has a spiral groove 83. The sleeve 81 is provided with corresponding internal feathers or splines which slidably fit into the respective grooves 82 and 83 of the two shafts as the sleeve 81 is slid over both shafts. As mentioned previously, the sleeve 81 provides coupling means to make the two shafts continuous for transferring rotation from one to the other. The spiral groove 83 of shaft 14 is machined so that the inclination thereof causes the control shaft 14 to rotate through part of a revolution relative to the power shaft 78, whenever the sleeve 81 selectively is shifted along the two shafts. Since the power shaft 78 is, as before described, connected to the aircraft engine 73 through the rotor gear box 60, its resistance to turning motion will be far greater than the opposing resistance offered by the control shaft 14. Thus, when the sleeve 81 is selectively translated along the two shafts in one direction or the other, the control shaft 14 accordingly will be advanced or retarded through part of a revolution from its normal rotary position relative to shaft 78.

Translation of the sleeve 81 along its axis of rotation may be effected by means of one or more actuators, such as the one indicated at 84. The actuator may be any known device capable of imparting axial motion to the sleeve 81 in either direction. It may be of the electric, pneumatic or mechanical type, or any combination thereof. Preferably, the actuator consists of a reversible electric motor 84 which is suitably attached, such as by bolting, to the wall of the casing 11. The motor 84 has a screwthread shaft 85 threadably engaging a radial arm 86 connected to the sleeve 81. The arm 86 is suitably supported and journaled between collar formations 87 of the sleeve so that the arm 82 is held from axial displacement but has freedom for relative rotation thereon.

The motor 84 may be selectively energized by any known or appropriate control device, including a suitable power source thereof. Obviously, the control device may be widely varied in design and application and, for this reason, none is shown. However, the motor 84 may be selectively controlled at the will of the pilot or by automatic means responsive to flight conditions. The controlling device may, for example, consist of a suitable electric switch or lever located in the cockpit within easy reach for manipulation. Also included, but not shown, is a suitable power circuit as well as motion-limiting devices for preventing overriding preselected operating limits of the dephasing unit. Additionally, it is contemplated empirically to interlink the dephasing unit control means with one or more of the existing flight control means of the helicopter.

From the foregoing, the general operation of the cyclic control dephasing unit will be apparent, however, briefly summarized, its operation is as follows: When the reversible motor 84 selectively is energized it causes, through the above-described coacting elements, axial displacement of the sleeve 81 along the shafts 14 and 78, either toward or away from the control unit 10. The effects produced by the lengthwise movements of the sleeve 81, is a turning backward of the control shaft 14 through part of a revolution relative to shaft 78 when the sleeve moves toward the control unit and a turning forward of shaft 14 when the sleeve 81 moves away from the control unit. Therefore, in the first case, since the control shaft 14 carries the cyclic control elements, the cyclic output is retarded and, in the second case, it occurs earlier than normal, thus retarding or advancing the azimuth point at which a cyclic control input to the rotor blades normally takes effect in the cycle of rotation.

Figure 3:
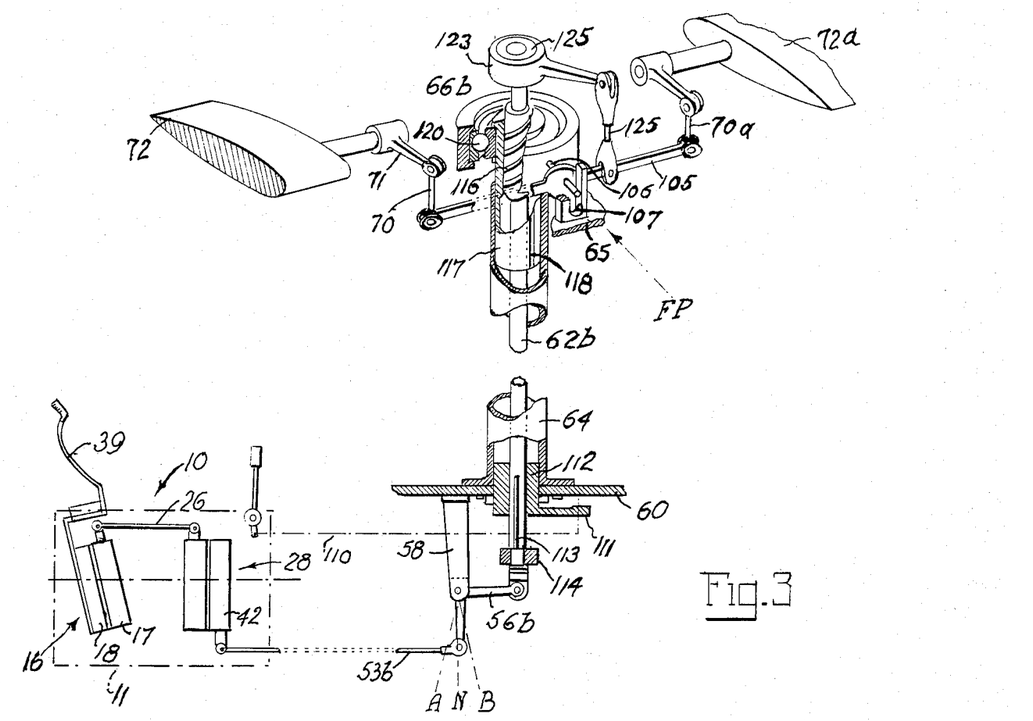
FIG. 3 is a modification of the invention in which the control unit is illustrated diagrammatically and the rotor system is shown in perspective and partly in section.

FIG. 3 is a modification of the invention, in which the cyclic control elements mounted in the casing 11 are, both in construction and operation, like those elements shown and described with reference to FIG. 1. Thus they bear the same identifying numerals, and no further description of these elements is deemed necessary.

However, in this arrangement certain collective pitch control elements have been removed from the casing 11 and an equivalent mechanism relocated, as will be described later. Also, as noted, the double train of motion transferring elements, of FIGS. 1 and 2, extending from the follower member 28 to the rotor blades has, in this arrangement, been changed to a single train of elements.

As shown in FIG. 3, one end of a single link 53b is pivoted directly to the follower ring 42 and the opposite end of the link 53b is pivoted to the vertical arm of the bell crank 56b. Through the interposed bearing coupling 114, the lower end of the control tube 62b is pivoted to the horizontal arm of the bell crank 56b. The coupling 114 allows the control tube 62b to turn relative to the bell crank 56b in order to impart collective pitch change to the rotor, as will appear later in detail. The control tube 62b is splined to and slidably passes through the bushing 112. The latter, whose purpose will be explained later, is rotatably mounted and suitably fixed against axial displacement in the lower opening of the standpipe 64, which latter is suitably fixed solidly to the lower all of the rotor gearbox 60.

The control tube 62b slidably passes through the vertical standpipe 64 and terminates within the confines of the rotor hub 65. Adjacent its upper end tube 62b carries for relative rotation ring 66b, and similarly carried on the upper end of the control tube 62b is a second ring member 123. (The rings 66b and 123 will be discussed in greater detail later). Ring 66b has a fixed radial pin 106 on which a control lever 105, intermediate its ends is fulcrumed. The outer end of the pin 106 extends through and is slidably guided during cyclic operation in a vertical guide slot 107 of hug 65, so that the ring 66b also is held for rotation with the rotor hub 65.

It should be noted that during cyclic operation, the control lever 105, like the control lever 49 of FIG. 1, has bodily movement with the control tube 62b in a plane containing the axis of the rotor. But, during this cyclic bodily movement, the control lever 105 also remains fixed or stationary with respect to its turn axis or pivot 106, until it is selectively turned thereabout by manipulation of the collective pitch mechanism, described later.

During cyclic operation of the control unit 10, the follower member 28, as previously described, receives an axial motion, of which the phase is the phase of cyclic feathering. This phased motion of the follower 28, through link 53b rocks the bell crank 56b accordingly, and causes the control tube 62b, the rings 123 and 66b and the lever 105 attached thereto, to move bodily in unison in a periodic up and down movement. This movement, through the aforesaid connection of the lever 105 with the rotor blade pitch arms, causes both blades 72 and 72a to rotate or rock in unison in the same direction as a virtual beam about their respective individual pitch change axes.

The collective pitch mechanism of FIG. 3, includes a manual control stick 90, which is like the stick 90 described with reference to FIG. 1. In this arrangement, pivoted to the stick 90 is one end of a link 110 and the opposite end of the latter is pivoted to the free end of the radial arm 111 of the bushing 112, before referred to. The control tube 62b slidably passes through the bushing 112 and is keyed or splined thereto at 113 for joint rotation, whereby selective rotation of the stick 90, through link 110, causes the control tube 62b to rotate accordingly.

A sleeve part 117 is slidably supported concentrically in the upper end of the standpipe 64. Corresponding slip-spline formations 118 formed in the sleeve 117 and standpipe 64 prevent relative rotation therebetween but permit free axial motion of the sleeve 117 relative to the standpipe 64. Adjacent its upper end, the control tube 62b has a threaded portion 116 which engages corresponding internal threads of the sleeve 117, so that rotation of the control tube 62b, in one direction or the other, through the coacting threads 116, accordingly causes an up or down movement of the sleeve 117 along the tube 62b and relative to standpipe 64. The ring member 66b, which pivotally carries the control lever 105, is solidly fixed on the upper end of the sleeve 117 and carried thereon for relative rotation by means of interposed bearing 120. Also, as previously mentioned, the ring member 123 is axially fixed on the upper end of the control tube 62b and carried on the latter for relative rotation by interposed bearing 125. One end of the link 126, beforereferred to, is pivoted to the integral arm 124 of the ring 123 and the opposite end of the link is pivoted to the control lever 105.

Thus, briefly described, to perform collective feathering of the rotor blades, the conventional manual pitch stick 90 selectively is rotated in one direction or the other which, accordingly, results in lengthwise movement of the link 110, causing the bushing 112 and the control tube 62b to rotate in unison. This rotation of the control tube 62b, through its threaded connection with the sleeve 117, causes the latter, together with the ring 66b and the control lever 105 pivoted thereto, accordingly, to translate relative to the tube 62b and the standpipe 64. As this movement of the lever 105 occurs, the latter moves against the opposing force of the link 126, thereby rotating or rocking the lever 105 about its pivot 106. This motion of the lever 105, through the beforediscussed connecting means of the latter with the rotor blades, causes both blades 72 and 72a to rotate or rock simultaneously, in equal and opposite directions, about their respective individual pitch change axes. Dependent upon the direction and magnitude of collective stick displacement, both rotor blades 72 and 72a, accordingly, receive either a simultaneous and equal pitch increase or a simultaneous and equal pitch decrease.

For the reasons before recited in connection with FIG. 1, the collective and cyclic pitch control sticks 90 and 39, respectively, of FIG. 3 may be actuated either singly or jointly without experiencing any feedback or control action interference therebetween.

Figure 4:
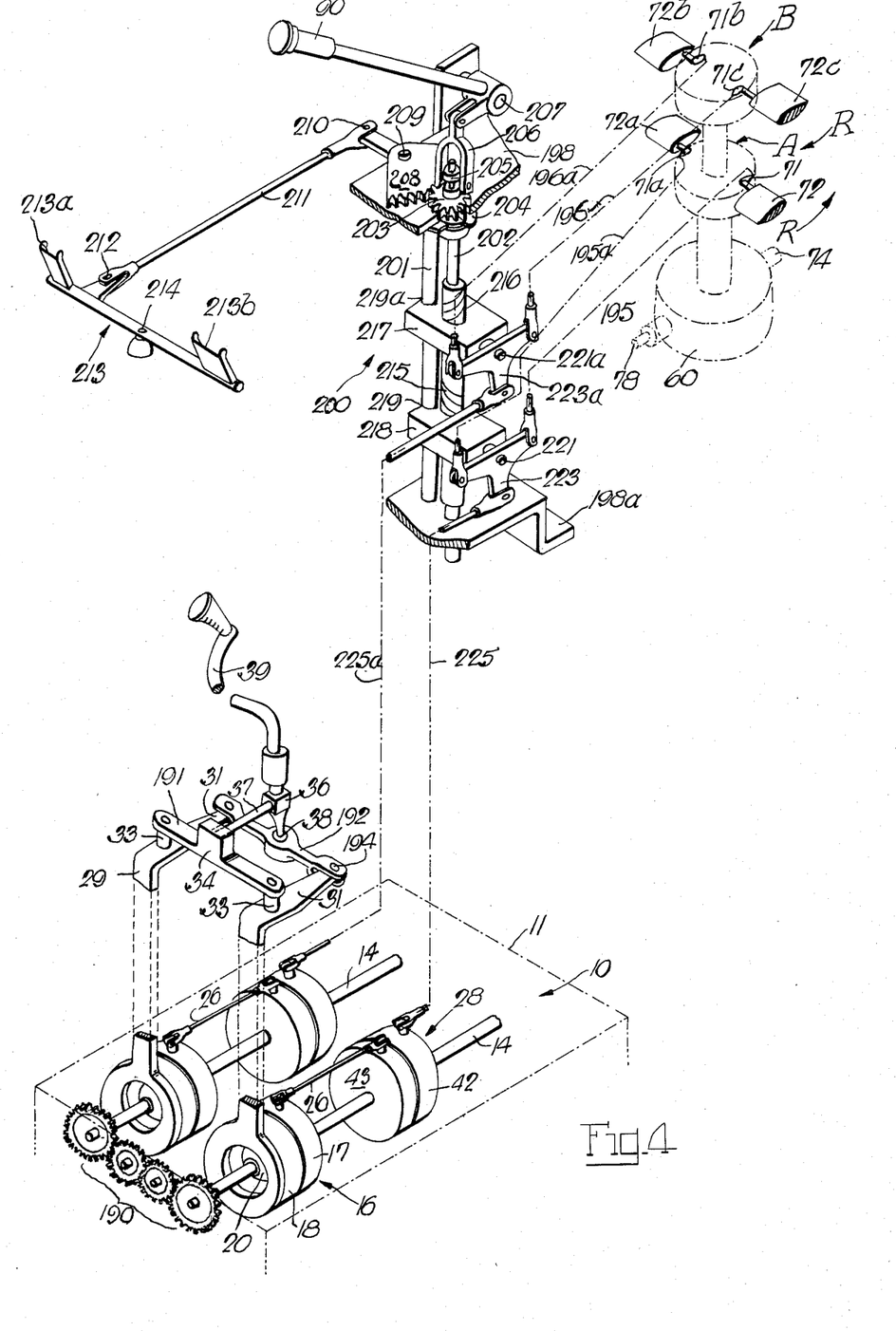
FIG. 4 is another modification of the control unit which may be utilized for controlling twin-rotor helicopters, such as shown diagrammatically.

FIG. 4 illustrates another modification of the invention, of which the control unit 10 may be used for controlling multi-rotor helicopters, such as the counterrotating coaxial twin-rotor system shown diagrammatically.

In the arrangement of FIG. 4, parts like those already described and shown with reference to the other figures, are identified by the same numerals. As shown, two identical control shafts 14 are journaled in spaced parallel relation in casing 11. Each shaft 14 carries identical swashplate and follower assemblies 16 and 28, respectively. Thus, the two shafts and coacting control units represent a mirror reflection of each other. In a manner already described, the two control units provide, respectively, a phased cyclic output control motion. In this arrangement, either one of the control shafts 14, like the shaft 14 of FIG. 1, may be drivingly coupled to the power drive means and included may be the cyclic control dephasing unit 80. Additionally, means are provided for selectively tilting both swashplate assemblies 16, jointly and in the same direction. To this end, the input control mechanism comprises the coacting input elements of FIG. 1 including the guide block 34, which, in this arrangement, has oppositely extending arms 191 pivoted at 33 to the respective arms 31 of the brackets 29. The opposite ends of the lever 192 are pivoted at 194 to the respective free ends of the arms 31. Intermediate its ends, the lever 192 has a pocket formation which embraces the spherical ball 38 of the lever 36, whereby selective displacement of the lever 36, accordingly, causes both swashplate units 16 to tilt in unison in the same direction, relative to the respective axes of the shafts 14.

The control elements of FIG. 4 designated 200 are illustrated removed from the casing 11, however these control elements, normally, will be mounted within the confines of the casing 11. This novel control mechanism provides three separate control functions—cyclic, collective and collective differential—which may be selectively actuated by conventional pilot control means and readily performed without experiencing control action interference or feedback therebetween.

In this arrangement, the control unit 200 comprises upper and lower brackets 198 and 198a, respectively, illustrated fragmentarily, which are solidly fixed together in vertically spaced relation by means of one or more rods or pillars 201 (one shown). The pillars may be fixed to the brackets in any suitable manner, such as by threaded means, riveting or welding. The assembled unit 200 may be inserted into the casing 11 through a suitable aperture (not shown) in the top wall of the casing 11. The upper bracket 198 will bridge the casing opening and be suitably secured thereon, such as by means of bolts, and the lower bracket 198a similarly may be fixed on the lower wall of the casing. Journaled for both sliding and turning movements in the opposed brackets 198 and 198a, and extending parallel to the before-mentioned pillar 201, is the shaft 202. The lower end of the latter is journaled in and slidably passes through a suitable hole in the bracket 198a. The upper end of the shaft 202 slidably extends coaxially through gear 203 for reciprocating motion therein along splines (not shown). The latter also serve to key the shaft 202 and gear 203 together for joint rotation. Gear 203 has a reduced diameter hub which projects through and is rotatably journaled in the upper bracket 198 and a C-shaped retaining member 204 prevents axial displacement of the gear 203.

Carried for relative rotation on the upper end of the shaft 202 and suitably fixed thereon against axial displacement, is the sleeve 205. Pivoted to the latter is the forked end of the link 206 and the opposite end of the latter is pivoted to the fixed arm of the manually operable collective lever or stick 90. The latter, of conventional construction, is fulcrumed at 207 to the upstanding portion of the bracket 198. Selective rotation of the collective stick 90, accordingly, results in an up or down movement of the shaft 202 which motion, through motion transferring means described later, imparts total or collective pitch control to the two rotor systems.

As already suggested, the shaft 202 is selectively turnable in either direction for imparting collective differential pitch control to the blades of each rotor system. This is accomplished by turning movements of the sector gear 208 in mesh with gear 203 and splined to the shaft 202, as before mentioned, for joint rotation therewith. As shown, the sector gear 208 is pivoted at 209 on the bracket 198. One end of the link 211 is pivoted at 210 to the sector gear 208 and the opposite end of the link 211 is pivoted at 212 to the foot operable assembly, generally designated 213. Swinging motion of the foot pedals in either direction about the vertical pivot 214, through the above-mentioned coacting parts, causes the shaft 202 to turn in one direction or the other. The latter has axially-spaced oppositely-threaded portions 215 and 216 to threadably engage the corresponding internally threaded bores of two similar nuts or blocks 217 and 218. The latter are notched at 219 and 219a to slidably embrace the before-mentioned pillar 201 so as to prevent rotary motion of the two blocks about the axis of shaft 202, as the latter is rotated. This rotation of the shaft 202 in one direction or the other, through the threaded engagement of the latter with the two blocks, accordingly causes the both blocks 217 and 218 to translate along the shaft 202, either toward or away from each other.

Projecting from and fixed solidly on the blocks 217 and 218 are similar pins 221 and 221a on which are fulcrumed a pair of similar levers 223 and 223a, respectively. Pivoted on the depending arms of the latter are the respective ends of links 225 and 225a. The opposite ends of the latter are pivoted respectively to the swashplate follower rings 42 and 42a, so that during periodic axial motion of the latter, both control levers 223 and 223a oscillate in unison about their respective pivots 221 and 221a.

Pivoted to the opposite ends of the lower control lever 223 are links 195 and 195a. The respective opposite ends of the latter are operatively connected, in a manner already discussed, to the pitch horns or arms 71 and 71a fixed on the rotor blades 72 and 72a of the lower rotor system, which is designated A in FIG. 4. In a similar manner, the other or upper control lever 223a is connected by control links 196 and 196a to the rotor blades 72c and 72d of the upper rotor system, designated B in FIG. 4.

It should be mentioned here that the motion transferring links, above-described, are schematically illustrated. However, in practice the links 225 and 225a generally will operate in a horizontal plane and the control links 195, 195a, 196 and 196a, generally in a vertical plane. Also, it should be noted that, in this arrangement, all the blade pitch horns or arms of both rotor systems of FIG. 4, unlike the arrangement of FIGS. 1 and 3, are fixed respectively on each blade with the free ends thereof extending generally in the same direction in the plane of rotation of the respective rotors, as indicated by the two arrows R.

Briefly summarized, the three control functions of the above-described units, are as follows: For cyclic feathering, in a manner already described with reference to FIG. 1, the two swashplates 17 rotating in any of their tilted positions, impart a periodic reciprocating motion to both followers 28, which causes both control levers 223 and 223a to oscillate in unison about their respective pivots 221 and 221a. This latter motion causes the two links 195 and 195a, pivoted to the lower control lever 223, to reciprocate in opposite directions relative to each other. This motion of the links is transferred to the lower rotor A and there causes the two blades 72 and 72a to rotate in unison as a virtual solid beam about their respective individual pitch change pivots. Simultaneously, the links 196 ad 196a, pivoted to the upper control lever 223a, receive a similar reciprocating motion which is transferred to the upper rotor B and there, in the same sense, this motion imparts cyclic pitch change to both blades 72b and 72c.

For collective pitch feathering, as usual, the collective pitch stick 90 may be selectively raised or lowered to either increase or decrease the pitch of all the blades of both rotor systems A and B, by an equal amount. Raising the lever 90, through the previously described parts, causes the shaft 202, the two blocks 217, 218, the control levers 223 and 223a and the four control links 195, 195a, 196 and 196a, to rise in unison. This upward movement in unison of the four control links causes each of the two blades of each rotor system to rotate simultaneously in equal and opposite directions about their respective individual pitch change pivots, thereby increasing the pitch of all the rotor blades by an equal amount.

Differential collective pitch control is applied to the two rotor systems by selectively swinging the foot pedal assembly 213 in one direction or the other about the vertical pivot 214. This motion of the pedals, through the before described associated parts, serves to turn the shaft 202 accordingly in one direction or the other, thereby causing the two blocks 217 and 218 accordingly to translate along the shaft 202, either toward or away from each other. Thus, when the block 217 together with the control lever 223a and the two links 196 and 196a rise in unison, the two rotor blades 72b and 72c of the upper rotor system B will receive a collective pitch increase. Simultaneously the block 218 with the control lever 223 and the links 195 and 195a will descend in unison through an equal distance causing the blades 72 and 72a of the lower rotor system A to receive an equal collective pitch decrease.

It will be apparent from the above discussion that whatever collective pitch is subtracted from one rotor is added to the other rotor without changing the total lift value of the two rotors. As usual, application of this collective differential to a twin rotor machine, such as shown in FIG. 4, will cause the craft to turn about a generally vertical axis in a dirction opposite to the rotational direction of the rotor receiving the greater pitch or torque increment.

Figure 8:
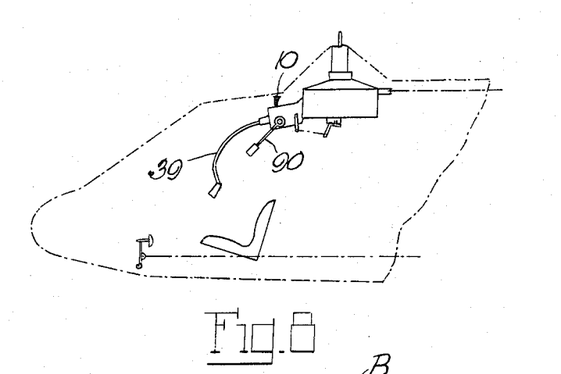
Figure 9:
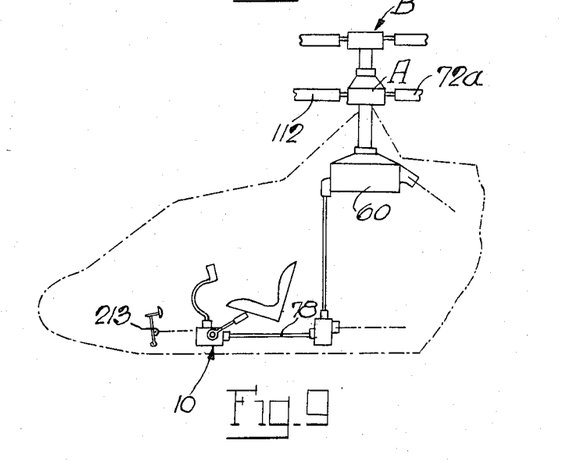

FIGS. 7, 8, and 9 suggest three of the many possible arrangements and mounting locations of the control unit 10 on an aircraft. These figures generally are self-explanatory, other than to mention that the control unit 15 may be mounted on a helicopter either adjacent to or at any desired horizontally spaced position relative to the rotor axis. These various positional changes may be readily accomplished by reversing or substituting the control mounting brackets 12 or by changing the drive shaft and control link to different suitable lengths. Such changes may be carried out without altering the internal construction of the control unit 10.

Figure 5:
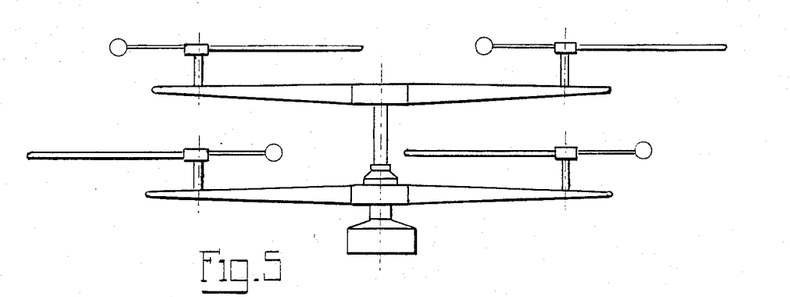
FIGS. 5 and 6 show, only by way of example, the control transmission means used in a helicopter of different configuration.
Figure 6:
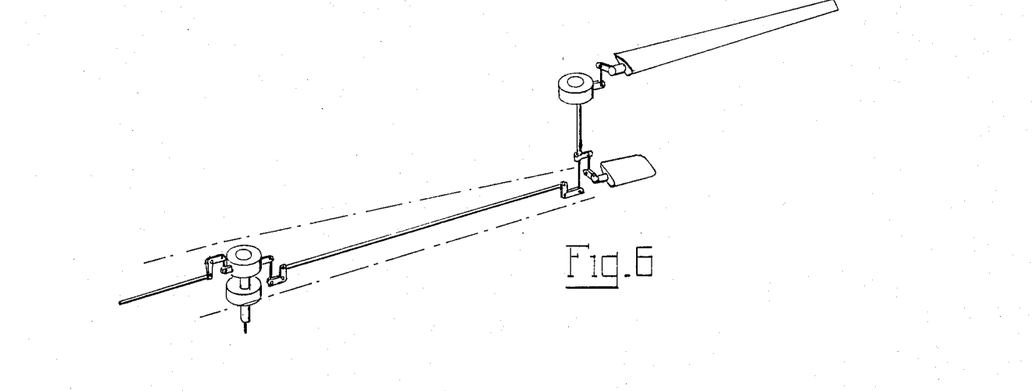

The craft illustrated in FIGS. 5 and 6 form no part of the present invention, but are included simply by way of example to show the means for extending the control transmission circuit from the control unit 10 to the rotor lift blades of this particular helicopter configuration which is shown and described in U.S. Pat. No. 3,762,669 issued to Curci.

Although the control circuits have been shown and described as including positive mechanical linkages, in some cases, it may be desirable, and it is contemplated, to substitute electrical, electronic or hydraulic control means. Additionally, any known device including power assist control or stabilizing means may be conveniently included in the casing 11 of the unit.

Further, it should be understood that all openings in the casing 11 to allow for passage of certain operating elements will be properly sealed in accordance with good engineering practice. For example, this may be accomplished by synthetic rubber seals or boots with a spring loaded lip to effectively seal out dirt and to provide required lubricant retention. Thus, as contemplated, the casing 11 will provide a lubricant reservoir and also conveniently include a low-pressure oil pump suitably driven from the shaft 14 for lubricating the internal control mechanism of the casing 11.

From the present disclosure, other modifications may be readily suggested, especially to those skilled in the art. For this reason, such obvious modifications are to be understood to fall within the range of the following claims.

What is claimed is:

1. In a helicopter, the combination with a power shaft having a main axis and bearings for supporting an even number of blades for individual pivoting about their longitudinal axes, arms mounted with one end on said blades, respectively, for pivoting the latter in the same and opposite directions for cyclic and total pitch control, respectively, of a control lever mounted intermediate its ends on a first pivot with a first axis which lies in a first plane in which said main axis lies, with said control lever having movability of first and second kinds bodily with its pivot axis in said plane and rockable about its pivot axis, respectively, links connecting the opposite ends of said control lever with the other ends of said arms for pivoting said blades in first and second directions on movements of said control lever of said first and second kinds, respectively, an axially immovable control shaft turning with the power shaft and having a universal bearing, a swashplate mounted on said universal bearing and turning with the control shaft, a first operating connection between said swashplate and first pivot, and including a follower member slidable on said control shaft and in follower relation with the swashplate, to impart to said control lever movement of one of said kinds on axial motion of said follower member, a manual control member operatively connected with the swashplate and operable for shifting the latter into any of its universal positions, another manual control member, a second operative connection between said other control member and control lever for imparting to the latter movement of said other kind on manipulating said other control member.

2. The combination in a helicopter as in claim 1, in which said blades pivot in the same direction on movement of said first kind of said control lever, and said blades pivot in opposite directions on movement of said second kind of said control lever.

3. The combination in a helicopter as in claim 1, in which said blades pivot in the same direction on movement of said second kind of said control lever, and said blades pivot in opposite directions on movement of said first kind of said control lever.

4. The combination in a helicopter as in claim 2, which further provides a rocker mounted with one end for turning movement about a second pivot and at its other end carrying said control lever for pivoting about said first pivot, with said second pivot extending normal to said first pivot.

5. The combination in a helicopter as in claim 2, in which said other control member is a stick pivotable about a fixed axis, and said second operative connection provides another arm on said control lever, and means connecting said stick with each other arm for rocking said control lever in opposite directions about said first pivot on rocking said stick in opposite directions.

6. The combination in a helicopter as in claim 2, which further provides an operating member mounted for movement in the direction of said main axis and held against rotating thereabout and carrying said first pivot wiith its axis normal to said main axis, and said first operating connection further including a part mounted for rotation about, and movement in the direction of said main axis and having a threaded connection with said operating member, with said operating member moving in opposite directions an axial movement of said follower member in opposite directions.

7. The combination in a helicopter as in claim 6, in which said second operative connection includes said part, a second pivot mount for said control lever for turning movement of the latter about an axis parallel to and spaced from said first axis, with said pivot mount moving in unison with said part in the direction of said main axis, and said first pivot being carried by said operating member.

8. The combination in a helicopter as in claim 7, which further provides a member with a slot in which said first pivot extends and is thereby guided for movement in the direction of said main axis, with said first pivot in said slot also holding said operating member against rotation.

9. The combination in a helicopter as in claim 8, in which said other control member is a stick pivotable about a fixed axis, and said second operative connection includes a second arm on said part, and means connecting said stick with said second arm for turning said part in opposite directions on rocking said stick in opposite directions.

10. The combination in a helicopter as in claim 1, in which said power shaft is the driving shaft and said control shaft is driven by said power shaft, and said swashplate and follower member constitute a control unit, and there is further provided an epicyclic train interposed in said control shaft between said control unit and power shaft, and means for adjusting said epicyclic train to thereby dephase the cyclic pitch control.

11. The combination in a helicopter as in claim 10, in which said blades comprise at least one pair, of which the blades of each pair are axially aligned, and said arms on the blades of each pair extend to one side of a plane in which said main axis and the axis of said blade pair lie.

12. In a helicopter, the combination of first and second main shafts driven in opposite directions about first and second parallel main axes and having bearings for supporting the blades of at least a first and second pair, respectively, for individual pivoting about their longitudinal axes, first and second arms mounted with one end on the blades of said first and second pair, respectively, for pivoting said blades in the same and opposite directions for cyclic and total pitch control, respectively, a first control shaft having a first reference axis and being turnable about, and movable in the direction of said reference axis, with said control shaft having oppositely directed first and second threads, first and second nuts turnable on said first control shaft and in mesh with said first and second threads, respectively, with said first and second nuts being held against rotation and carrying first and second pivots extending normal to said control shaft, first and second control levers mounted intermediate their ends on said first and second pivots, respectively, first and second links connecting the opposite ends of the respective first and second control levers with the other ends of said first and second arms, respectively, for pivoting the blades of each pair in the same direction for said cyclic pitch control on rocking movement of said first and second control levers about said first and second pivots, respectively, and for bodily moving said first and second control levers jointly for said total pitch control on axial motion of said control shaft, as well as for bodily moving said first and second control levers in opposite directions for differential collective pitch control on turning movement of said control shaft, axially immovable second and third control shafts turning with the respective first and second main shafts and having first and second universal bearings, respectively, first and second swashplates mounted on said first and second universal bearings, respectively, for shiftability into universal positions thereon and turning with the respective second and third control shafts, first and second members slidable on the respective second and third control shafts and in follower relation with said first and second swashplates, respectively, first and second operating connections between said first and second members and the opposite ends of said first and second control levers for imparting rocking movement to the latter for said cyclic blade pitch control on sliding movement of said first and second members on the respective second and third control shafts, a first manual control member operatively connected with said swashplates and operable to shift the latter into indentical universal positions, means including a second manual control member for imparting axial motion to said first control shaft for said total blade pitch control on manipulating said second manual control member, and means including a third manual control member for imparting turning movement to said first control shaft for differential collective pitch control on manipulating said third manual control member.

* * * * *